US011968488B2

(12) United States Patent
Kim et al.

(10) Patent No.: US 11,968,488 B2
(45) Date of Patent: Apr. 23, 2024

(54) MIC STRUCTURE AND ELECTRONIC DEVICE INCLUDING THE SAME

(71) Applicant: SAMSUNG ELECTRONICS CO., LTD., Suwon-si (KR)

(72) Inventors: Kwanghyun Kim, Suwon-si (KR); Kyueun Park, Suwon-si (KR); Brian Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 17/850,080

(22) Filed: Jun. 27, 2022

(65) Prior Publication Data

US 2022/0386007 A1 Dec. 1, 2022

Related U.S. Application Data

(63) Continuation of application No. PCT/KR2022/007368, filed on May 24, 2022.

(30) Foreign Application Priority Data

May 26, 2021 (KR) ........................ 10-2021-0067805

(51) Int. Cl.

*H04R 1/08* (2006.01)

*H04R 1/04* (2006.01)

(Continued)

(52) U.S. Cl.

CPC ............... *H04R 1/083* (2013.01); *H04R 1/04* (2013.01); *H04R 1/2892* (2013.01); *H04R 1/326* (2013.01); *H04R 2499/11* (2013.01)

(58) Field of Classification Search

CPC . H04R 1/04; H04R 1/083; H04R 1/28; H04R 1/2892; H04R 1/326; H04R 1/342; H04R 1/347; H04R 1/406; H04R 2499/11

See application file for complete search history.

(56) References Cited

U.S. PATENT DOCUMENTS

| | | | |
|---|---|---|---|
| 7,920,904 B2 | 4/2011 | Kim et al. | |
| 10,440,457 B2 | 10/2019 | Yamaguchi | |

(Continued)

FOREIGN PATENT DOCUMENTS

| | | |
|---|---|---|
| CN | 204652665 U | 9/2015 |
| CN | 105611011 A | 5/2016 |

(Continued)

OTHER PUBLICATIONS

Search Report and Written Opinion dated Aug. 30, 2022 issued in International Patent Application No. PCT/ KR2022/007368.

*Primary Examiner* — Kile O Blair

(74) *Attorney, Agent, or Firm* — Nixon & Vanderhye, P.C.

(57) ABSTRACT

An electronic device according to various embodiments may include: a housing, an acoustic hole formed in a first direction of the housing, an instrument installed in the housing in a second direction perpendicular to the first direction, a mic, and a mic holder including a body installed in the housing, a seat formed in the body part to receive the mic, a first opening formed in one surface of the body and connected to the seat, a second opening formed in another surface of the body, and a third opening formed in the body and connected to the acoustic hole. As the second opening of the mic holder is closed by an instrument of the electronic device closely attached to the other surface of the body part, an acoustic channel in which a sound introduced into the third opening is delivered to a mic hole of the mic may be formed.

20 Claims, 9 Drawing Sheets

(51) Int. Cl.

| | |
|---|---|
| ***H04R 1/28*** | (2006.01) |
| ***H04R 1/32*** | (2006.01) |

(56) References Cited

U.S. PATENT DOCUMENTS

| | | | |
|---|---|---|---|
| 10,587,952 | B2 | 3/2020 | Jacobs |
| 10,819,836 | B2 | 10/2020 | Lim et al. |
| 2010/0074454 | A1 | 3/2010 | Kang |
| 2012/0128191 | A1 | 5/2012 | Jung et al. |
| 2020/0107446 | A1 | 4/2020 | Maki |
| 2020/0329303 | A1 | 10/2020 | Sim et al. |
| 2021/0037125 | A1 | 2/2021 | Jung et al. |
| 2021/0352392 | A1 | 11/2021 | Kim et al. |

FOREIGN PATENT DOCUMENTS

| | | | |
|---|---|---|---|
| CN | 105848021 | A | 8/2016 |
| CN | 211702105 | A | 10/2020 |
| CN | 214851664 | U | 11/2021 |
| KR | 10-2012-0055168 | | 5/2012 |
| KR | 10-2019-0121119 | | 10/2019 |
| KR | 10-2020-0038031 | | 4/2020 |
| KR | 10-2020-0109903 | | 9/2020 |
| KR | 10-2020-0119105 | | 10/2020 |
| KR | 10-2021-0015268 | | 2/2021 |

MIC STRUCTURE AND ELECTRONIC DEVICE INCLUDING THE SAME

CROSS-REFERENCE TO RELATED APPLICATIONS

This application is a continuation of International Application No. PCT/KR2022/007368 designating the United States, filed on May 24, 2022, in the Korean Intellectual Property Receiving Office and claiming priority to Korean Patent Application No. 10-2021-0067805, filed on May 26, 2021, in the Korean Intellectual Property Office, the disclosures of which are incorporated by reference herein in their entireties.

BACKGROUND

Field

The disclosure relates to a mic structure and an electronic device including the same.

Description of Related Art

A mobile electronic device becomes slim by considering moving convenience and a design. In order to construct the electronic device in a slim form, various electronic parts included in the electronic device also need to be slimly constructed.

Various sound devices (e.g., a mic and a speaker) included in the electronic device may include a channel structure for delivering a sound.

In order to slimly construct an electronic device, a sound device included in the electronic device also needs to be slimly implemented. The sound device may include a channel structure for delivering a sound.

For example, a mic for converting an external sound into an electrical signal may include a channel structure for delivering the external sound to the mic. When considering recording quality of the mic, the volume of the channel structure needs to be secured to a given level or more. Furthermore, the channel structure needs to be airtight so that a sound does not leak to another part.

It may be difficult for the sound device to be slimly constructed due to requirements for the channel structure. For example, if the channel structure is formed in an instrument that receives the sound device, it may be difficult to deploy the instrument in a slim housing due to the volume of the instrument itself including the channel structure.

SUMMARY

Embodiments of the disclosure provide a mic structure including a channel structure constructed in a slim form and an electronic device including the same.

An electronic device according to various example embodiments may include: a housing, an acoustic hole formed in a first direction of the housing, an instrument installed in the housing in a second direction perpendicular to the first direction, a mic, and a mic holder including a body part installed in the housing, a seated part formed in the body part and receiving in the seated part, a first opening formed in one surface of the body part and connected to the seated part, a second opening formed in another surface of the body part, and a third opening formed in the body part and connected to the acoustic hole. As the second opening of the mic holder is closed by an instrument of the electronic device closely attached to the other surface of the body part, an acoustic channel in which a sound introduced into the third opening is delivered to a mic hole of the mic may be formed.

A mic structure according to various embodiments may include: a mic, and a mic holder including a body part installed in a housing of an electronic device, a seated part formed in the body part and received in the seated part, a first opening formed in one surface of the body part and connected to the seated part, a second opening formed in another surface of the body part, and a third opening formed in the body part and connected to an acoustic hole formed in the housing. As the second opening of the mic holder is closed by an instrument of the electronic device closely attached to the other surface of the body part, an acoustic channel in which a sound introduced into the third opening is delivered to a mic hole of the mic may be formed.

According to various example embodiments, a slim electronic device can be implemented by reducing the size of a mic structure including a mic and a channel structure for delivering a sound to the mic. Furthermore, by simplifying a path in which a sound is delivered to the mic, the mic can perform a recording function with designated quality.

BRIEF DESCRIPTION OF THE DRAWINGS

In relation to the description of the drawings, the same or similar reference numerals may be used with respect to the same or similar elements. Additionally, the above and other aspects, features and advantages of certain embodiments of the present disclosure will be more apparent from the following detailed description, taken in conjunction with the accompanying drawings, in which.

DETAILED DESCRIPTION

Figure 1:
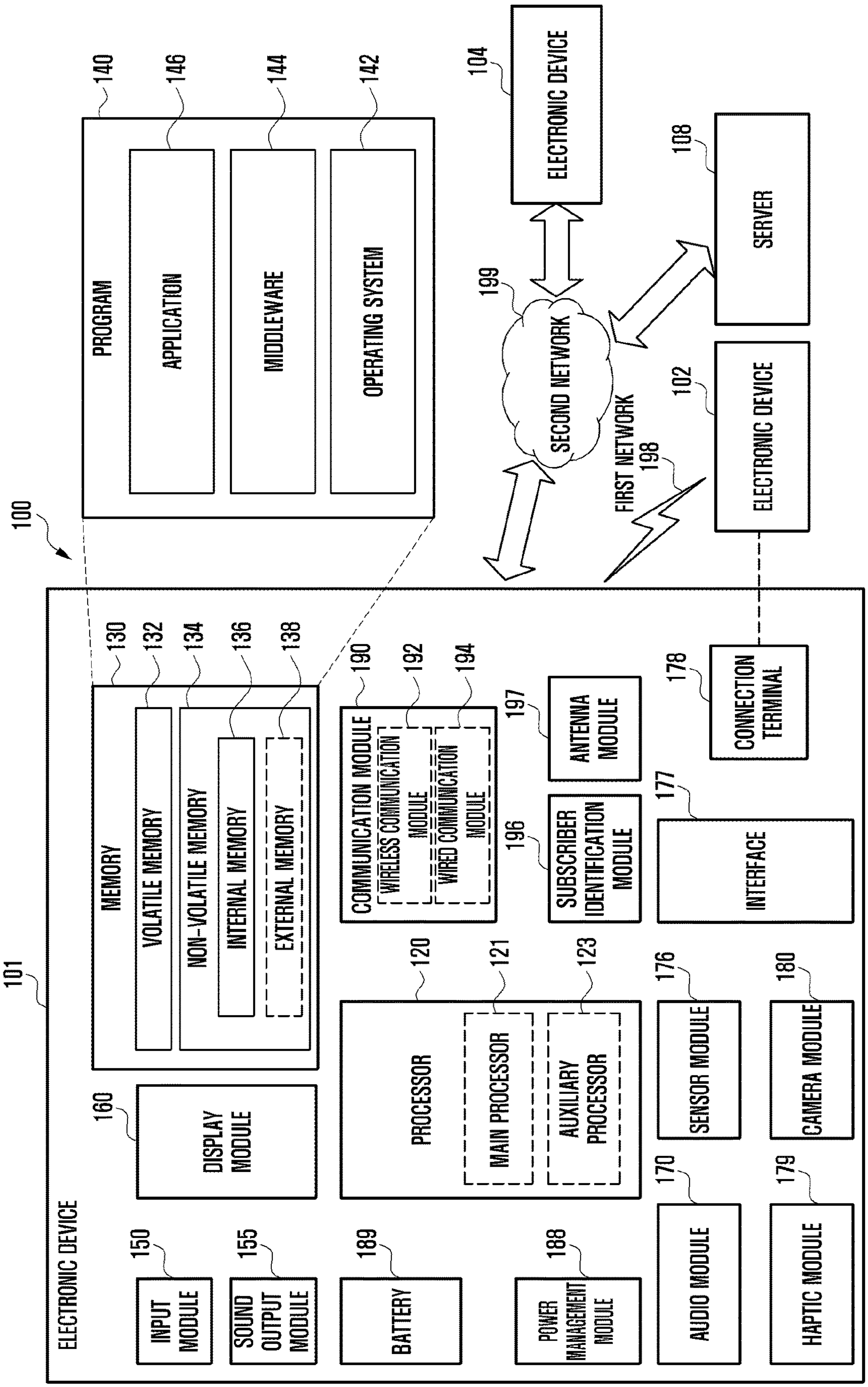
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
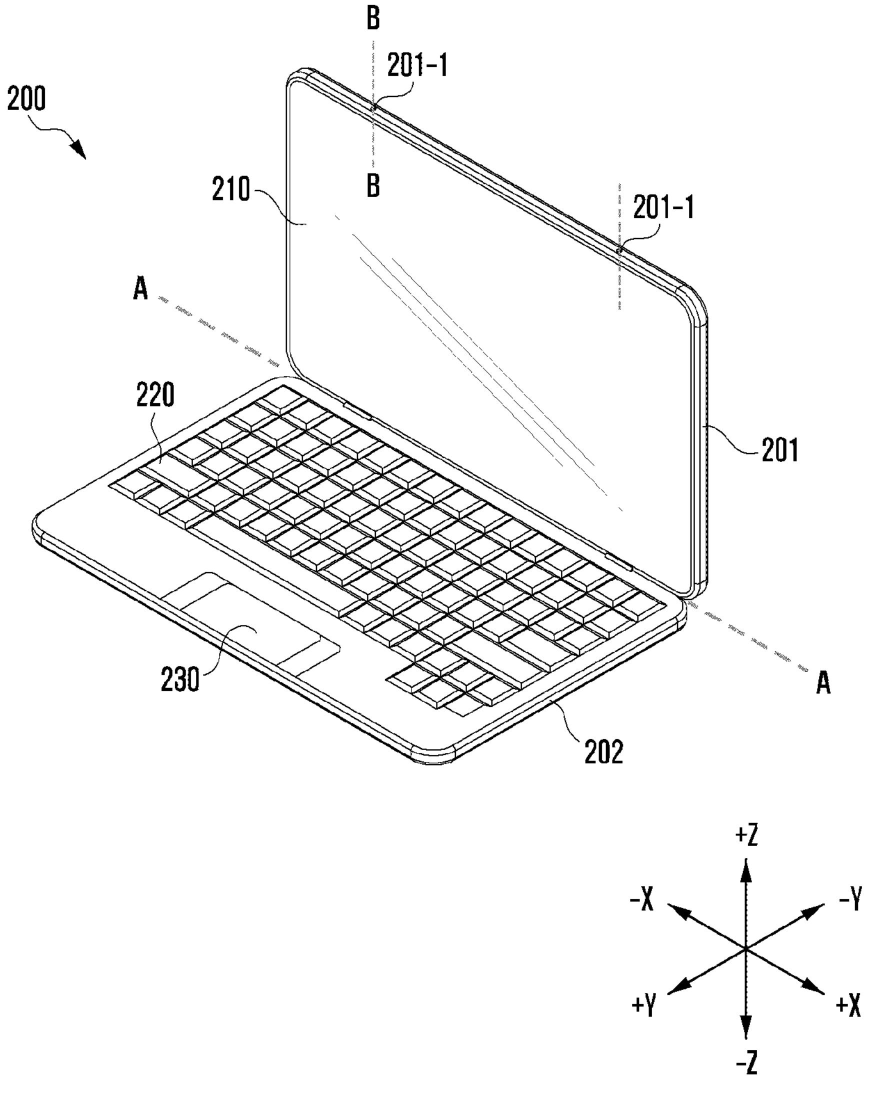
FIG. 2 is a perspective view of an electronic device according to various embodiments.

FIG. 2 is a perspective view illustrating an example electronic device according to various embodiments.

The electronic device 200 illustrated in FIG. 2 may be an embodiment of the electronic device 101 described with reference to FIG. 1. Referring to FIG. 2, the electronic device 200 may, for example, be an electronic device having a laptop form. The electronic device 200 may include a first housing 201 and a second housing 202 that are rotatably coupled. For example, the first housing 201 may be coupled to the second housing 202 in a way to be rotatable around an axis A-A illustrated in FIG. 2.

In an embodiment, a display 210 (e.g., the display module 160 in FIG. 1) capable of displaying information may be disposed in the first housing 201. Various types of input means may be disposed in the second housing 202. For example, a physical keyboard 220 or a pad (e.g., a touch pad 230) capable of recognizing a touch may be disposed in the second housing 202.

In an embodiment, a camera (e.g., the camera module 180 in FIG. 1, for example, a camera 400 in FIG. 3) and a mic (the term "mic" as used herein may be used interchangeably with the term microphone) structure (e.g., a mic structure 300 in FIG. 3) may be disposed in the first housing 201. An acoustic hole 201-1 for introducing an external sound into a mic (e.g., a mic 301 in FIG. 6) disposed in the first housing 201 may be disposed in the first housing 201. The acoustic hole 201-1 may be formed in a +Z direction on the basis of FIG. 2. Hereinafter, the direction in which the acoustic hole 201-1 is formed in the first housing 201 may be referred to as a "first direction." The display module 210 disposed in the first housing 201 may be disposed in the first housing 201 in a direction (i.e., a +Y direction on the basis of FIG. 2) perpendicular to the first direction. Hereinafter, the direction in which the display module 210 is disposed may be referred to as a "second direction."

As the acoustic hole 201-1 is formed in the first direction, the acoustic hole 201-1 may not be covered with the second housing 202 even in the state in which the first housing 201 and the second housing 202 have been folded.

Hereinafter, the electronic device 200 illustrated in FIG. 2 is basically described for convenience of description. However, a mic structure (e.g., the mic structure 300 in FIG. 3) according to various embodiments is not applied to only the electronic device 200 illustrated in FIG. 2, and may be applied to various types of electronic devices.

Figure 3:
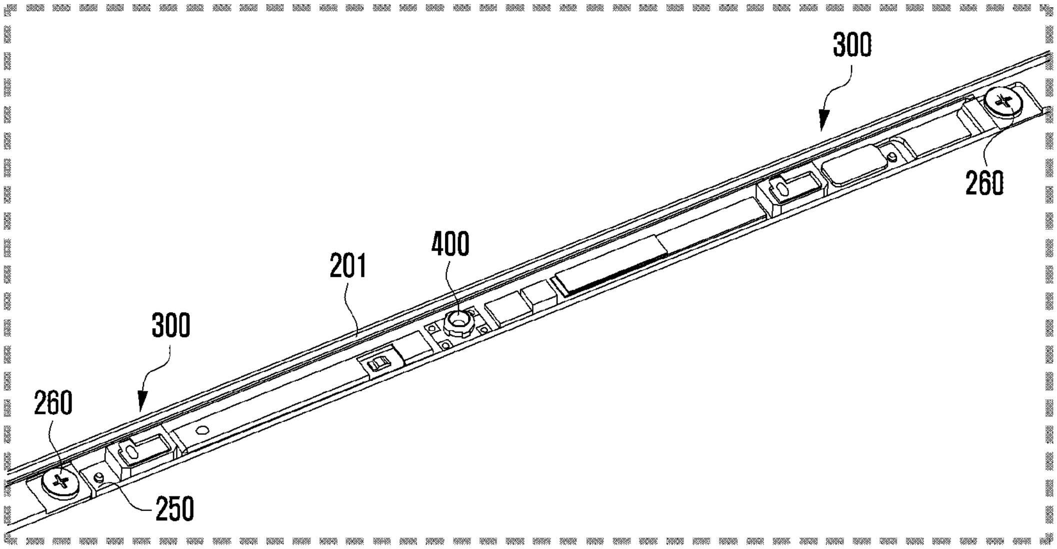
FIG. 3 is a diagram illustrating an example mic structure disposed in a housing and peripheral elements of the mic structure according to various embodiments.

FIG. 3 is a diagram illustrating an example mic structure disposed in a housing and peripheral elements of the mic structure according to various embodiments.

FIG. 3 is a diagram illustrating the state in which an instrument (e.g., the display module 210) coupled to the first housing 201 has been removed. The mic structure 300 disposed in the first housing 201 may include a mic (e.g., the mic 301 in FIG. 6) and a mic holder (e.g., the mic holder 302 in FIG. 6) for receiving the mic 301.

According to various embodiments, the camera 400 and the mic disposed in the first housing 201 may be electrically connected to the same printed circuit board (PCB) 250. For example, the camera 400 and the mic may be configured as one module by being electrically connected to the same PCB 250.

Figure 6:
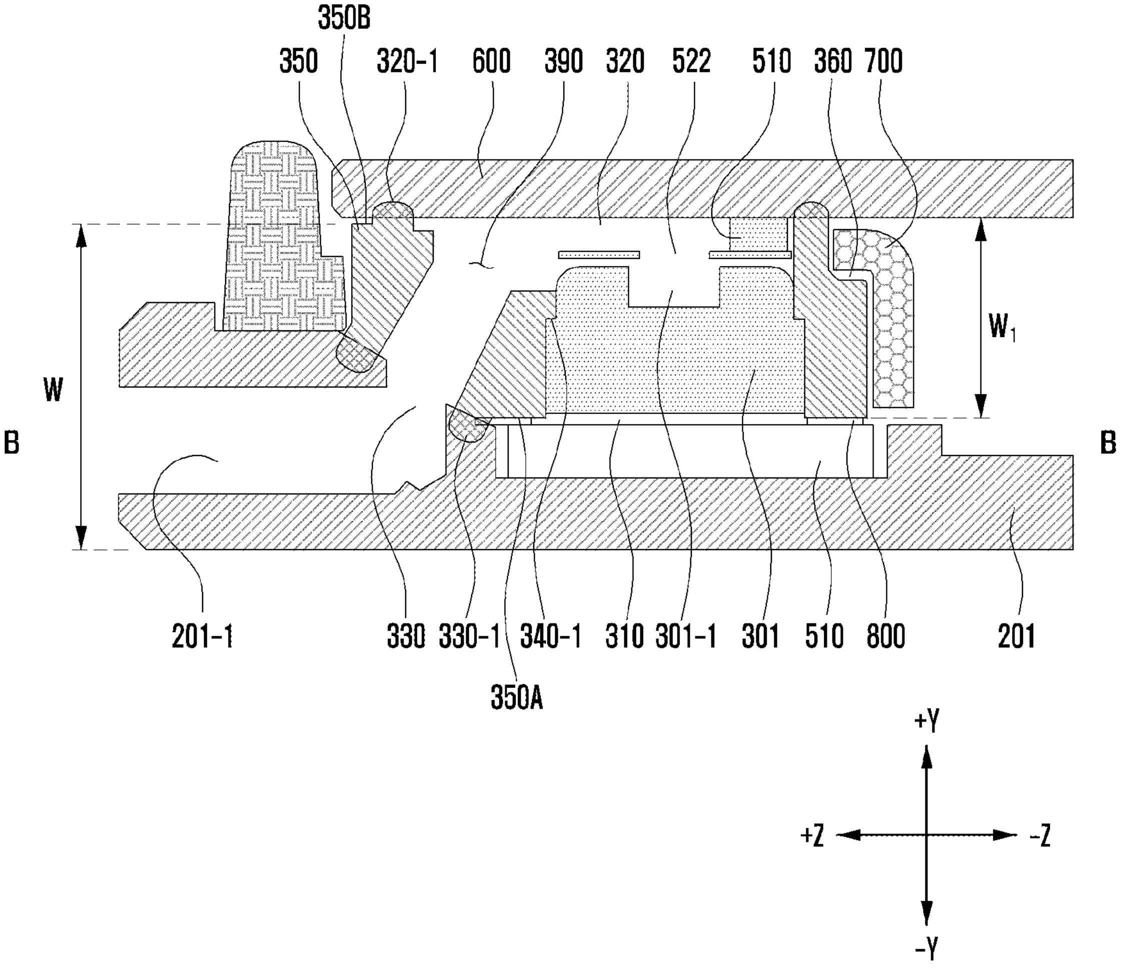
FIG. 6 is a cross-sectional view illustrating the state in which the mic holder has been installed in the electronic device according to various embodiments.

In an embodiment, the PCB 250 in which the camera 400 and the mic structure 300 are disposed may be coupled to the first housing 201 in various ways. For example, as illustrated in FIG. 3, the PCB 250 (or a member supporting the PCB 250) may be coupled to the first housing 201 through the coupling of bolts or screws 260. Although not illustrated in FIG. 3, a fixing bracket (e.g., a fixing bracket 700 in FIG. 6) fixed to the first housing 201 may be coupled to the camera 400, the mic structure 300 and the PCB 250 in which the camera 400 and the mic structure 300 are disposed. Referring to FIG. 6, the fixing bracket 700 may fix a mic holder to be described in greater detail below to the first housing 201.

An electronic device according to various example embodiments may include a plurality of mic structures 300. For example, as illustrated in FIG. 3, the mic structure 300 may be disposed on the left and right of the camera 400 on. In an embodiment, the mic structures 300 disposed on the left and right of the camera 400 may be isolated from each other and disposed at a given interval of the camera 400 for an echo canceling function. Echo canceling may refer, for example, to a function for cancelling sound information corresponding to an echo by analyzing acoustic information picked up from a plurality of mics. Two mic structures 300 may be isolated from each other and disposed on the basis of the camera 400 so that a sound that needs to be picked up and a sound corresponding to an echo can be distinguished. Furthermore, acoustic holes (e.g., the acoustic holes 201-1 in FIG. 2) connected to the plurality of mic structures 300, respectively, may be formed in the first housing 201 so that the acoustic holes are directed toward the same direction (e.g., the +Z direction on the basis of FIG. 2). A deployment relation between the mic structure 300 and the camera 400 may be variously changed, and the number of mic structures 300 may also be variously changed.

The mic structure 300 may include a mic holder (e.g., a mic holder 302 in FIG. 4) and a mic (e.g., the mic 301 in FIG. 6) received in the mic holder. The mic holder may connect a mic hole (e.g., a mic hole 301-1 in FIG. 6) formed in the mic and an acoustic hole (e.g., the acoustic hole 201-1 in FIG. 6) formed in the first housing 201. According to various embodiments, an acoustic channel (e.g., a acoustic channel 390 in FIG. 6) that connects the acoustic hole and the mic hole of the mic may be formed by the mic holder and an instrument that faces the mic holder. This is described in greater detail below.

Figure 4A:
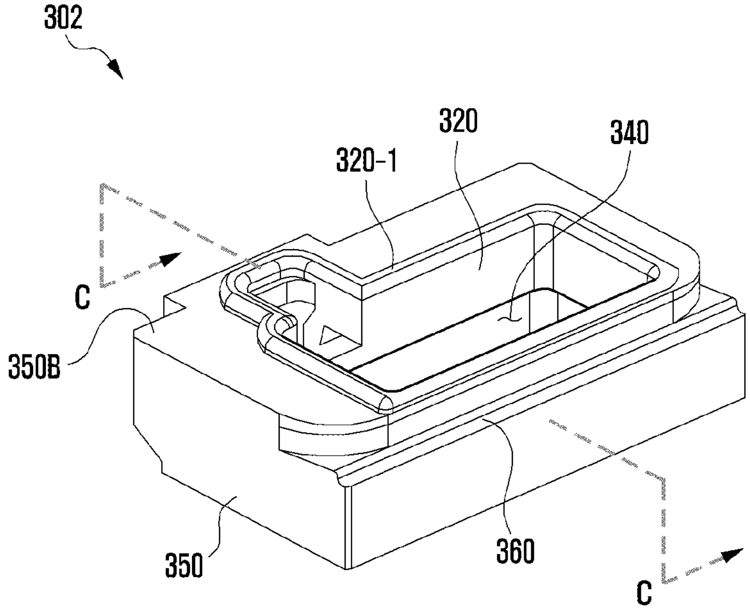
FIG. 4A is a perspective view of a mic holder according to various embodiments.
Figure 4B:
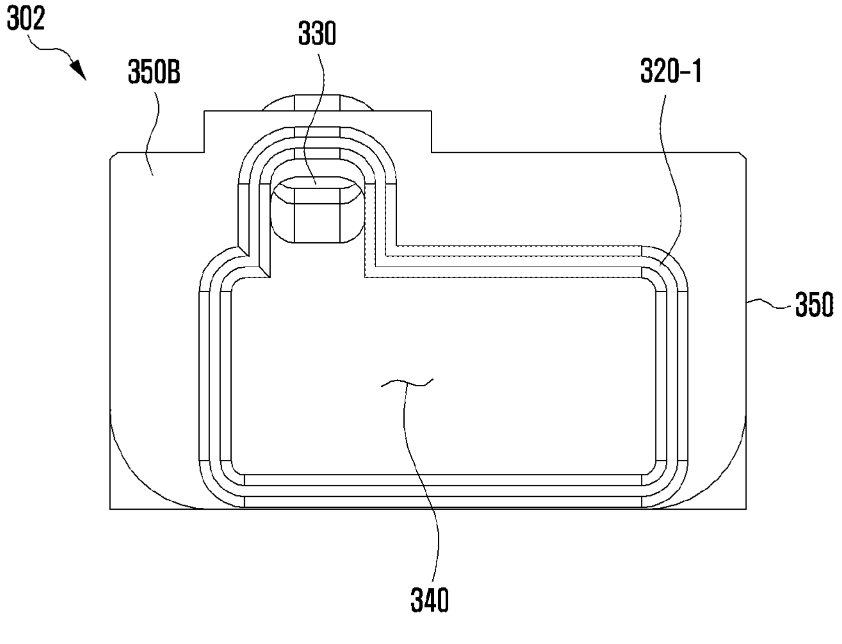
FIG. 4B is a diagram illustrating the mic holder according to various embodiments.
Figure 4C:
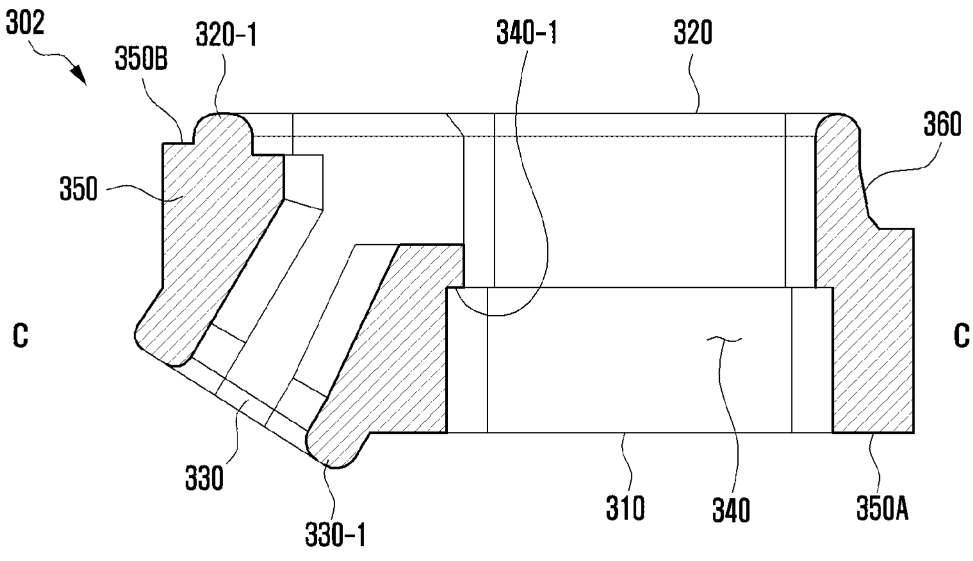
FIG. 4C is a cross-sectional view of the mic holder taken along line C-C illustrated in FIG. 4A according to various embodiments.
Figure 5A:
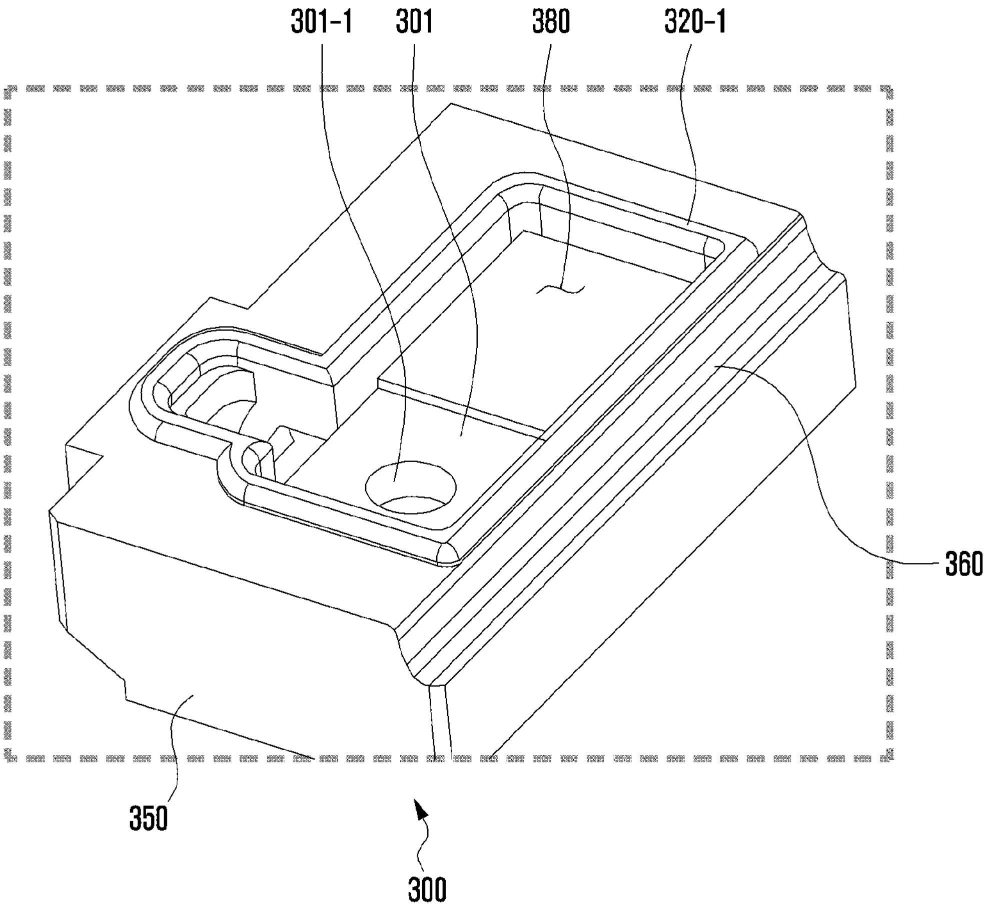
FIG. 5A is a perspective view of the mic holder illustrating the state in which a filling member has been removed according to various embodiments.
Figure 5B:
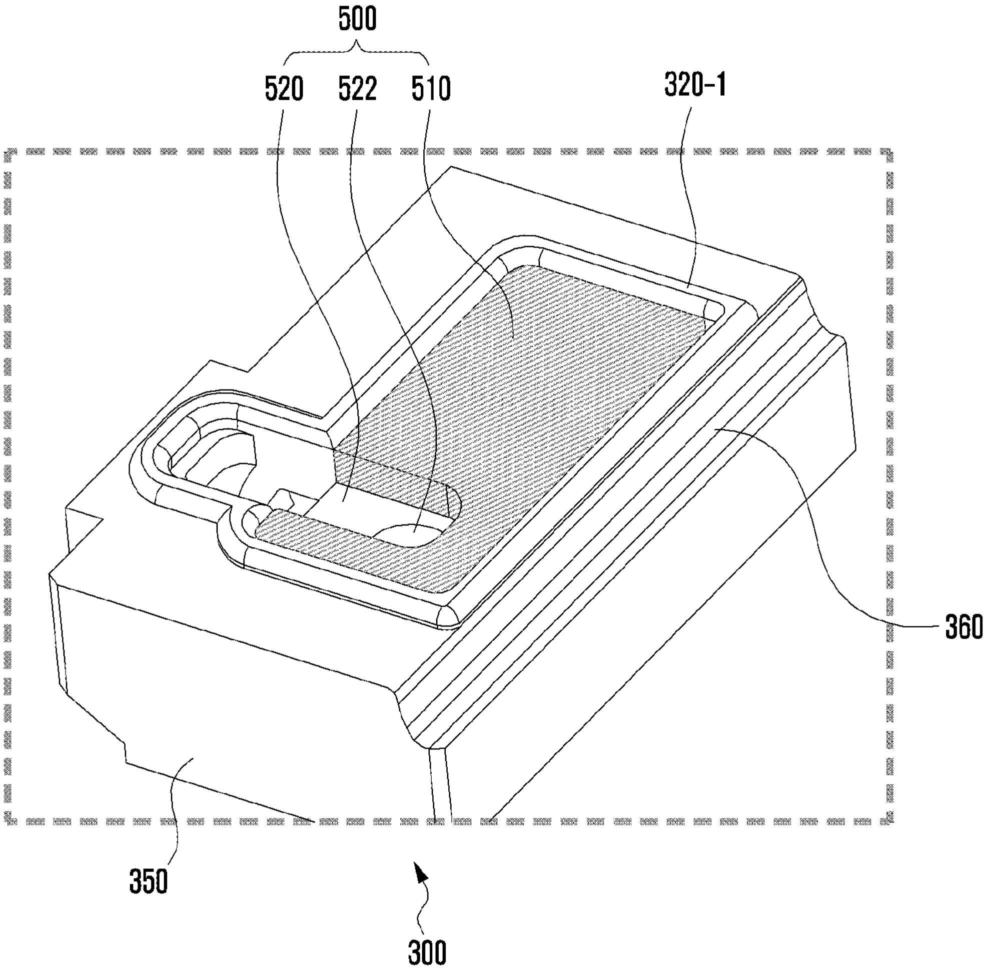
FIG. 5B is a perspective view of the mic holder illustrating the state in which the filling member has been disposed according to various embodiments.

FIG. 4A is a perspective view of the mic holder according to various embodiments. FIG. 4B is a diagram illustrating the mic holder according to various embodiments. FIG. 4C is a cross-sectional view of the mic holder taken along line C-C illustrated in FIG. 4A according to various embodiments. FIG. 5A is a perspective view of the mic holder illustrating a state in which a filling member has been removed according to various embodiments. FIG. 5B is a perspective view of the mic holder illustrating a state in which the filling member has been disposed according to various embodiments. FIG. 6 is a cross-sectional view illustrating a state in which the mic holder has been installed in the electronic device according to various embodiments. FIG. 6 may be a cross-sectional view of the electronic device taken along line A-A illustrated in FIG. 2.

With reference to FIGS. 4A, 4B and 4C, the mic holder 302 which receives the mic 301 and forms the acoustic channel 390 (refer to FIG. 6) for delivering a sound to the mic 301 may be included.

In an embodiment, the mic holder 302 may include a body part (e.g., a body) 350, a seated part (e.g., a seat) 340, a first opening 310, a second opening 320 and a third opening 330.

In an embodiment, the body part 350 of the mic holder 302 may be made of a material having elasticity. For example, the body part 350 may be made of a rubber material. The body part 350 of the mic holder 302 may be closely attached to other instruments facing the mic holder 302, so that a shape thereof may be partially deformed. The body part 350 may be formed in a shape to generally surround the mic 301.

In an embodiment, the seated part 340 may include a space formed within the body part 350. The mic 301 is received in the seated part 340. The first opening 310 formed in one surface 350A of the body part 350 may be an opening formed in the body part 350 in a way to connect the outside of the mic holder 302 and the seated part 340.

According to various embodiments, the mic 301 may be received in the seated part 340 of the mic holder 302 in a way to insert the mic holder 302 into the mic 301 disposed in the PCB 250. The mic 301 may be inserted into the first opening 310 connected to the seated part 340 of the mic holder 302. The mic 301 may be inserted into the mic holder 302 until the mic 301 is trapped at a trapping jaw 340-1 formed on the inside of the seated part 340. As the mic 301 is trapped at the trapping jaw 340-1 formed on the inside of the seated part 340, the mic 301 may be no longer inserted in the state in which the mic 301 has been inserted into the seated part 340 to a designated location.

In an embodiment, the one surface 350A of the body part 350 in which the first opening 310 is formed may be closely attached to the PCB 250 in which the mic 301 has been disposed and the first housing 201. In order to provide airtightness between the one surface 350A of the body part 350, the PCB 250 and the second housing 202 and to fix the body part 350, a fixing member 800 (refer to FIG. 6) may be disposed between the one surface 350A of the body part 350, the PCB 250 and the second housing 202. The fixing member 800 may include an adhesive material, for example.

In an embodiment, the second opening 320 may be formed in the body part 350. The second opening 320 may be formed in the other surface 350B of the body part 350 corresponding to a surface opposite to the one surface 350A of the body part 350 in which the first opening 310 is formed.

In an embodiment, the second opening 320 of the body part 350 may be penetrated and connected to the first opening 310. For example, as illustrated in FIG. 4C, since the first opening 310 is connected to the seated part 340 and the second opening 320 is also connected to the seated part 340, the first opening 310 and the second opening 320 may be connected. In an embodiment, the trapping jaw 340-1 may be formed between the first opening 310 and the second opening 320. For another example, the first opening 310 and the second opening 320 may be integrated.

In an embodiment, the third opening 330 may be formed in the body part 350. The third opening 330 may be an opening formed in the body part 350 in a way to be connected to the acoustic hole 201-1 formed in the first housing 201. Referring to FIG. 6, the third opening 330 and a portion of the body part 350 in which the third opening 330 is formed may be shaped in accordance with a shape of the acoustic hole 201-1. FIG. 6 illustrates that a portion in which the acoustic hole 201-1 and the body part 350 face each other has been slantedly formed with respect to the first direction (e.g., the +Z direction in FIG. 6), but this is merely an example. For example, the portion in which the acoustic hole 201-1 and the body part 350 face each other may be parallel to the first direction or may be formed in a direction perpendicular to the first direction.

In an embodiment, the body part 350 may include a first airtight protrusion 320-1 and a second airtight protrusion 330-1. The first airtight protrusion 320-1 and the second airtight protrusion 330-1 may be parts protruded to an external surface of the body part 350. For example, the first airtight protrusion 320-1 and the second airtight protrusion 330-1 may be integrated with the body part 350. In an embodiment, the first airtight protrusion 320-1 and the second airtight protrusion 330-1 may be fabricated separately from the body part 350, and may be coupled to the body part 350 in various ways.

In an embodiment, the first airtight protrusion 320-1 may be formed on an outer circumference of the second opening 320. The first airtight protrusion 320-1 protruded to the outer circumference of the second opening 320 may be closely attached to an instrument (e.g., an instrument 600 in FIG. 6) that faces the other surface 350B of the body part 350 in which the second opening 320 is formed. The first airtight protrusion 320-1 may provide airtightness between the second opening 320 and the instrument. In a process of coupling the instrument to the first housing 201, a part of the first airtight protrusion 320-1 may be deformed.

In an embodiment, the second airtight protrusion 330-1 may be formed on an outer circumference of the third opening 330. The second airtight protrusion 330-1 protruded to the outer circumference of the third opening 330 may be closely attached to the first housing 201. The second airtight protrusion 330-1 may provide airtightness between the third opening 330 and the first housing 201.

According to various embodiments, the mic holder 302 may include the acoustic channel 390 (refer to FIG. 6) for delivering a sound, introduced through the acoustic hole 201-1 formed in the first housing 201, to the mic hole 301-1 of the mic 301 received in the seated part 340. The acoustic channel 390 may be formed within the body part 350 of the mic holder 302 in a way to connect the seated part 340 in which the mic 301 is received, the second opening 320 and the third opening 330.

In this case, the "channel" may refer, for example, to a passage in which the delivery of a sound (or a sound wave) is guided. For example, the channel may refer, for example, to a physical space. The channel may include a space with which a medium capable of delivering a sound wave is filled. Hereinafter, to deliver a sound through the channel may refer, for example, to a sound being delivered via a specific space.

According to various embodiments, the acoustic channel 390 may be formed because the second opening 320 is closed by the instrument 600 closely attached to the other surface 350B of the body part 350. In order for the mic 301 to operate with designated quality, the width of the acoustic channel 390 for delivering a sound to the mic 301 needs to be secured to a given level or more. For example, if the second opening 320 is filled with the body part 350, in order to secure the width of the acoustic channel 390, a height W1 of the mic holder 302 may be generally increased due to the thickness of the body part 350 that fills a portion where the second opening 320 is formed. In various embodiments, the height W1 of the mic structure 300 can be generally reduced in a way to form the acoustic channel 390 by closing the second opening 320 through the instrument 600 of an electronic device closely attached to the mic holder 302 not the body part 350. When the height W1 of the mic structure 300 is reduced, a thickness W of the first housing 201 in which the mic structure 300 is installed can become slim. Accordingly, if the mic structure 300 having the structure disclosed herein is used, the first housing 201 having the slim form may be applied.

A height difference may be present between a location where the acoustic hole 201-1 is formed and a location where the mic hole 301-1 is formed as illustrated, for example, in FIG. 6. At least a part of the acoustic channel 390 may be slantedly formed to connect the acoustic hole 201-1 and the mic hole 301-1 having a height difference. For example, a part of the acoustic channel 390 extending from the third opening 330, connected to the acoustic hole 201-1, to the second opening 320 may be slantedly extended toward a +Y direction and a −Z direction as illustrated, for example, in FIG. 6. The aforementioned extension direction of the acoustic channel 390 is merely an example, and the extension direction of the acoustic channel 390 may be variously changed depending on a location where the acoustic hole 201-1 is formed and a location where the mic hole 301-1 is disposed.

In an embodiment, a sound introduced through the acoustic hole 201-1 may be delivered to the mic hole 301-1 of the mic 301 without leaking to the outside of the acoustic channel 390 by the second airtight protrusion 330-1 providing airtightness between the first housing 201 and the third opening 330 and the first airtight protrusion 320-1 providing airtightness between the instrument and the second opening 320.

With reference to FIGS. 5A and 5B, a filling member (e.g., filling) 500 may be disposed in a space 380 between the seated part 340 of the mic holder 302 and the second opening 320. The filling member 500 may be made of a material different from that of the body part 350. For example, the filling member 500 may be made of a material having lower elasticity than that of the body part 350 of the mic holder 302. The filling member 500 may fill a part of the space 380 of the acoustic channel 390 so that a sound introduced through the acoustic hole 201-1 is directly delivered to the mic hole 301-1.

For example, as illustrated in FIG. 5A, an empty space 380 may be formed between the seated part 340 in which the mic 301 is seated and the second opening 320 in the state in which the filling member 500 has been removed. A sound introduced through the third opening 330 may be delivered to the empty space 380. If the empty space 380 is large, recording performance of the mic 301 may be degraded. In various embodiments, a passage in which the acoustic channel 390 delivers a sound can be simplified by filling the space 380 with the filling member 500. If a part of the acoustic channel 390 is filled with the filling member 500, a sound delivery passage can be shortened. When the sound delivery passage is shortened, recording performance of the mic 301 can be improved.

In an embodiment, the filling member 500 may include a filling body 510 and a channel part 520. The filling body 510 may be a body of the filling member 500. The filling body 510 fills the space 380 between the second opening 320 and the seated part 340, so that the sound delivery passage of the acoustic channel 390 can be simplified. The channel part 520 may be concavely formed in one surface of the filling body 510. The channel part 520 may include a connection hole 522 connected to the mic hole 301-1. In an embodiment, at least a part of the filling member 500 may be removed up to a part facing the mic hole 301-1, thereby forming the sound delivery passage. For example, at least a part of the filling member 500 that faces the mic hole 301-1 may be removed, and the filling member 500 may be disposed in the second opening 320. Referring to FIG. 5B, the channel part 520 of the filling member 500 may be a part that guides a sound introduced through the third opening 330 so that the sound is delivered to the mic hole 301-1 of the mic 301. As the filling body 510 of the filling member 500 fills the empty space 380 of the mic holder 302 and the channel part 520 of the filling member 500 delivers, to the mic hole 301-1, a sound introduced through the third opening 330, the sound delivery passage of the acoustic channel 390 can be shortened.

In an embodiment, the filling body 510 of the filling member 500 may be made of an elastic material, a material that prevents and/or reduces the reflection of a sound or a sound-absorbing material capable of absorbing a sound. The filling body 510 made of such a material can suppress a sound from being spread into the space 380 between the second opening 320 and the seated part 340. In an embodiment, as illustrated in FIG. 5B, the filling body 510 disposed in the body part 350 of the mic holder 302 may be disposed lower than the first airtight protrusion 320-1 protruded in the periphery of the second opening 320. As illustrated in FIG. 6, the first airtight protrusion 320-1 may be closely attached to the instrument 600 and deformed in the state in which the instrument 600 has closed the second opening 320. Accordingly, the instrument 600 may be closely attached to the filling body 510.

According to various embodiments, a fixing part 360 may be formed in an external surface of the body part 350 in a shape corresponding to the fixing bracket 700. For example, as illustrated in FIGS. 4A and 6, the fixing part 360 may be concavely formed in the external surface of the body part 350. The fixing bracket 700 may be fixed to the first housing 201. The mic holder 302 can be stably fixed at a designated location by the fixing bracket 700 fixed to the first housing 201. In an embodiment, the fixing bracket 700 may be an element that supports and fixes a camera (e.g., the camera 400 in FIG. 3) included in the electronic device and the PCB 250 in which the camera is disposed.

In an embodiment, the instrument 600 coupled to the first housing 201 in a second direction (e.g., the +Y direction in FIG. 6) to face the other surface 350B of the mic holder 302 may be a window member (e.g., window) 600 included in a display module (e.g., the display 210 in FIG. 2). At least a part of the window member 600 may be made of a transparent material. The window member 600 may be an element for protecting an element (e.g., a display panel) of the display module. For example, the window member 600 may include glass and/or plastic (e.g., polycarbonate and/or polymethylmethacrylate). For example, at least a part of an area of the window member 600 corresponding to the acoustic channel 390 may include a black matrix area. In addition, the instrument 600 of an electronic device that forms the acoustic channel 390 by facing the other surface 350B of the mic holder 302 and closing the second opening 320 may be various elements. For example, the instrument 600 may be a plate 600 coupled to the first housing 201 in the second direction. The plate 600 may be made of metal or a synthetic resin material.

An electronic device (e.g., the electronic device 101 in FIG. 1 or the electronic device 200 in FIG. 2) according to various example embodiments may include: a housing (e.g., the first housing 201 in FIG. 2), an acoustic hole (e.g., the acoustic hole 201-1 in FIG. 2) formed in a first direction of the housing, an instrument (e.g., the display module 210 in FIG. 2) installed in the housing in a second direction perpendicular to the first direction, a mic (e.g., the mic 301 in FIG. 6), and a mic holder (e.g., the mic holder 302 in FIG. 4A) including a body (e.g., the body part 350 in FIG. 4A) installed in the housing, a seat (e.g., the seated part 340 in FIG. 4A) formed in the body part and configured to receive the mic, a first opening (e.g., the first opening 310 in FIG. 4C) formed in one surface of the body part and connected to the seat, a second opening (e.g., the second opening 320 in FIG. 4A) formed in another surface of the body, and a third opening (e.g., the third opening 330 in FIG. 4C) formed in the body and connected to the acoustic hole. Based on the second opening of the mic holder being closed by the instrument being closely attached to the other surface of the body part, an acoustic channel (e.g., the acoustic channel 390 in FIG. 6) in which a sound introduced into the third opening is delivered to a mic hole (e.g., the mic hole 301-1 in FIG. 6) of the mic can be formed.

According to an example embodiment, the mic holder may include a first airtight protrusion (e.g., the first airtight protrusion 320-1 in FIG. 6) protruding from an outer circumference of the second opening and closely attached to the instrument so that the second opening and the instrument are airtight.

According to an example embodiments, the mic holder may include a second airtight protrusion (e.g., the second airtight protrusion 330-1 in FIG. 6) protruding from the outer circumference of the third opening and closely attached to the housing so that the third opening and the acoustic hole are airtight.

According to an example embodiment, the mic holder may comprise an elastic material.

According to an example embodiment, a filling (e.g., the filling member 500 in FIG. 5B) disposed in the space between the seated part of the mic holder and the second opening may be further included.

According to an example embodiment, the filling may include a filling body (e.g., the filling body 510 in FIG. 5B) filling at least a part of the acoustic channel, and a channel part (e.g., the connection part 520 in FIG. 5B) including a connection hole (e.g., the connection hole 522 in FIG. 5B) concavely formed in one surface of the filling and connected to the mic hole.

According to an example embodiment, the filling may comprise a material having relatively lower elasticity than a material of the mic holder.

According to an example embodiment, the electronic device may further include a camera (e.g., the camera 400 in FIG. 3) and a printed circuit board (PCB) (e.g., the PCB 250 in FIG. 3) to which the camera is electrically connected. The mic may be electrically connected to the PCB.

According to an example embodiment, a fixing bracket (e.g., the fixing bracket 700 in FIG. 6) configured to fix the camera and the PCB to the housing may be further included. The mic holder may further include a fixing part (e.g., the fixing part 360 in FIG. 6) formed in the body part in a shape corresponding to the fixing bracket, and may be configured to be fixed to the housing by the fixing bracket.

According to an example embodiment, the instrument may include a window (e.g., the window member 600 in FIG. 6) included in the display module of the electronic device.

A mic structure (e.g., the mic structure 300 in FIG. 3) according to various example embodiments may include: a mic (e.g., the mic 301 in FIG. 6), and a mic holder (e.g., the mic holder 302 in FIG. 4A) including a body (e.g., the body part 350 in FIG. 4A) installed in a housing (e.g., the first housing 201 in FIG. 2) of an electronic device (e.g., the electronic device 101 in FIG. 1 or the electronic device 200 in FIG. 2), a seat (e.g., the seated part 340 in FIG. 4A) formed in the body to receive the mic, a first opening (e.g., the first opening 310 in FIG. 4C) formed in one surface of the body part and connected to the seat, a second opening (e.g., the second opening 320 in FIG. 4A) formed in another surface of the body part, and a third opening (e.g., the third opening 330 in FIG. 4C) formed in the body and connected to an acoustic hole (e.g., the acoustic hole 201-1 in FIG. 2) formed in the housing. Based on the second opening of the mic holder being closed by an instrument (e.g., the display module 210 in FIG. 2) of the electronic device closely attached to the other surface of the body, an acoustic channel (e.g., the acoustic channel 390 in FIG. 6) in which a sound introduced into the third opening is delivered to a mic hole (e.g., the mic hole 301-1 in FIG. 6) of the mic can be formed.

According to an example embodiment, the mic holder may include a first airtight protrusion (e.g., the first airtight protrusion 320-1 in FIG. 6) protruding from the outer circumference of the second opening and closely attached to the instrument so that the second opening and the instrument are airtight.

According to an example embodiment, the mic holder may include a second airtight protrusion (e.g., the second airtight protrusion 330-1 in FIG. 6) protruding from the outer circumference of the third opening and closely attached to the housing so that the third opening and the acoustic hole are airtight.

According to an example embodiment, the mic holder may comprise an elastic material.

According to an example embodiment, a filling (e.g., the filling member 500 in FIG. 5B) disposed in the space between the seat of the mic holder and the second opening may be further included.

According to an example embodiment, the filling may include a filling body (e.g., the filling body 510 in FIG. 5B) configured to fill at least a part of the acoustic channel, and a channel part (e.g., the connection part 520 in FIG. 5B) including a connection hole (e.g., the connection hole 522 in FIG. 5B) concavely formed in one surface of the filling and connected to the mic hole.

According to an example embodiment, the filling may comprise a material having relatively lower elasticity than a material of the mic holder.

According to an example embodiment, the electronic device may further include a camera (e.g., the camera 400 in FIG. 3) and a printed circuit board (PCB) (e.g., the PCB 250 in FIG. 3) to which the camera is electrically connected. The mic of the mic structure may be electrically connected to the PCB.

According to an example embodiment, the electronic device may further include a fixing bracket (e.g., the fixing bracket 700 in FIG. 6) configured to fix the camera and the PCB to the housing. The mic holder of the mic structure may further include a fixing part (e.g., the fixing part 360 in FIG. 6) formed in the body part in a shape corresponding to the fixing bracket, and may be fixed to the housing by the fixing bracket.

According to an example embodiment, the instrument of the electronic device may include a window (e.g., the window member 600 in FIG. 6) included in the display module of the electronic device.

An electronic device according to various example embodiments may include various forms of devices. The electronic device may include a portable communication device (e.g., a smartphone), a computer device, a portable multimedia device, a portable medical device, a camera, a wearable device, home appliances, or the like, for example. An electronic device according to an embodiment is not limited to the aforementioned devices.

Various embodiments and terms used in the embodiments are not intended to limit the technical characteristics, described in the disclosure, to specific embodiments, and should be understood as including various changes, equivalents or alternatives of a corresponding embodiment. In relation to the description of the drawings, similar reference numerals may be used for similar or related elements. A singular form of a noun corresponding to an item may include one item or a plurality of items unless explicitly described otherwise in the context. In this disclosure, each of phrases, such as "A or B", "at least one of A and B", "at least one of A or B", "A, B or C," "at least one of A, B and C", and "at least one of A, B, or C", may include any one of items listed along with a corresponding one of the phrases or all possible combinations of the listed items. Terms, such as a "first", a "second", or "the first" or "the second", may be used to merely distinguish between a corresponding element and another corresponding element, and do not limit corresponding elements in another aspect (e.g., importance or sequence). If any (e.g., first) element is described as being "coupled" or "connected" to another (e.g., a second) element along with a term "functionally" or "communicatively" or without such a term, the any element may be coupled to the another element directly (e.g., in a wired way), wirelessly, or through a third element.

The term "module" used in various embodiments of this disclosure may include a unit implemented as hardware, software or firmware, or any combination thereof, and may be interchangeably used with a term, such as logic, a logical block, a part, or a circuit. The module may be an integrated part, or a minimum unit of the part or a part thereof, which performs one or more functions. For example, according to an embodiment, the module may be implemented in the form of an application-specific integrated circuit (ASIC).

Various embodiments of this disclosure may be implemented as software (e.g., the program 140) including one or more instructions stored in a storage medium (e.g., the embedded memory 136 or the external memory 138) readable by a machine (e.g., the electronic device 101). For example, a processor (e.g., the processor 120) of a machine (e.g., the electronic device 101) may invoke at least one of the one or more instructions stored in the storage medium, and may execute the instruction. This enables the machine to operate to perform at least one function based on the invoked at least one instruction. The one or more instructions may include a code generated by a complier or a code executable by an interpreter. The machine-readable storage media may be provided in the form of a non-transitory storage medium. In this case, the "non-transitory" storage medium is a tangible device and may not include a signal (e.g., electromagnetic wave). The term does not distinguish between a case where data is semi-permanently stored in the storage medium and a case where data is temporally stored in the storage medium.

According to an embodiment, the method according to various embodiments may be included in a computer program product and provided. The computer program product may be traded as a product between a seller and a purchaser. The computer program product may be distributed in the form of a machine-readable storage medium (e.g., a compact disc read only memory (CD-ROM)) or may be distributed through an app store (e.g., PlayStore™) or directly between two user devices (e.g., smartphones) or online (e.g., download or upload). In the case of the online distribution, at least some of the computer program products may be at least temporarily stored or provisionally generated in a machine-readable storage medium, such as the memory of the server of a manufacturer, the server of an app store or a relay server.

According to various embodiments, each (e.g., module or program) of the described elements may include a single entity or a plurality of entities, and some of a plurality of entities may be separately disposed in another element. According to various embodiments, one or more elements or operations of the aforementioned elements may be omitted or one or more other elements or operations may be added. Alternatively or additionally, a plurality of elements (e.g., modules or programs) may be integrated into a single element. In such a case, the integrated element may perform a function performed by a corresponding one of the plurality of elements before at least one function of each of the plurality of elements is integrated identically or similarly. According to various embodiments, operations performed by a module, a program or another element may be executed sequentially, in parallel, iteratively, or heuristically, or one or more of the operations may be executed in different order or may be omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing;

an acoustic hole formed in a first direction of the housing;

an instrument installed in the housing in a second direction perpendicular to the first direction;

a mic; and a mic holder comprising a body installed in the housing, a seat formed in the body part to receive the mic, a first opening formed in one surface of the body and connected to the seat, a second opening formed in another surface of the body, and a third opening formed in the body and connected to the acoustic hole, wherein based on the second opening of the mic holder being closed by an instrument of the electronic device closely attached to the other surface of the body, an acoustic channel in which a sound introduced into the third opening is delivered to a mic hole of the mic is formed.

2. The electronic device of claim 1, wherein the mic holder comprises a first airtight protrusion protruding from an outer circumference of the second opening and closely attached to the instrument so that the second opening and the instrument are airtight.

3. The electronic device of claim 1, wherein the mic holder comprises a second airtight protrusion protruding from an outer circumference of the third opening and closely attached to the housing so that the third opening and the acoustic hole are airtight.

4. The electronic device of claim 1, wherein the mic holder comprises an elastic material.

5. The electronic device of claim 1, further comprising a filling disposed in a space between the seat of the mic holder and the second opening.

6. The electronic device of claim 5, wherein the filling comprises:

a filling body configured to fill at least a part of the acoustic channel, and a channel part comprising a connection hole concavely formed in one surface of the filling body and configured to be connected to the mic hole.

7. The electronic device of claim 5, wherein the filling comprises a material having relatively lower elasticity than a material of the mic holder.

8. The electronic device of claim 1, wherein:

the electronic device further comprises a camera and a printed circuit board (PCB) to which the camera is electrically connected, and the mic is electrically connected to the PCB.

9. The electronic device of claim 8, further comprising a fixing bracket configured to fix the camera and the PCB to the housing, wherein the mic holder further comprises a fixing part formed in the body in a shape corresponding to the fixing bracket, and is fixed to the housing by the fixing bracket.

10. The electronic device of claim 1, wherein the instrument comprises a window included in a display of the electronic device.

11. A mic structure comprising:

a mic; and a mic holder comprising a body installed in a housing of an electronic device, a seat formed in the body to receive the mic, a first opening formed in one surface of the body and connected to the seat, a second opening formed in another surface of the body, and a third opening formed in the body and connected to an acoustic hole formed in the housing, wherein as the second opening of the mic holder is closed by an instrument of the electronic device closely attached to the other surface of the body, an acoustic channel in which a sound introduced into the third opening is delivered to a mic hole of the mic is formed.

12. The mic structure of claim 11, wherein the mic holder comprises a first airtight protrusion protruding from an outer circumference of the second opening and closely attached to the instrument so that the second opening and the instrument are airtight.

13. The mic structure of claim 11, wherein the mic holder comprises a second airtight protrusion protruding from an outer circumference of the third opening and closely attached to the housing so that the third opening and the acoustic hole are airtight.

14. The mic structure of claim 11, wherein the mic holder comprises an elastic material.

15. The mic structure of claim 11, further comprising a filling disposed in a space between the seat of the mic holder and the second opening.

16. The mic structure of claim 15, wherein the filling comprises:

a filling body configured to fill at least a part of the acoustic channel, and a channel part comprising a connection hole concavely formed in one surface of the filling and connected to the mic hole.

17. The mic structure of claim 15, wherein the filling comprises a material having relatively lower elasticity than a material of the mic holder.

18. The mic structure of claim 11, wherein:

the electronic device further comprises a camera and a printed circuit board (PCB) to which the camera is electrically connected, and the mic of the mic structure is electrically connected to the PCB.

19. The mic structure of claim 18, wherein:

the electronic device further comprises a fixing bracket configured to fix the camera and the PCB to the housing, and the mic holder of the mic structure further comprises a fixing part formed in the body part in a shape corresponding to the fixing bracket, and is fixed to the housing by the fixing bracket.

20. The mic structure of claim 11, wherein the instrument of the electronic device comprises a window included in a display of the electronic device.

* * * * *